United States Patent
Gobius du Sart et al.

(10) Patent No.: US 12,460,046 B2
(45) Date of Patent: Nov. 4, 2025

(54) PROCESS FOR POLYMERIZING LACTIDE USING A LIQUID CATALYST FORMULATION

(71) Applicant: TotalEnergies Corbion B.V., Gorinchem (NL)

(72) Inventors: Gerrit Gobius du Sart, Herwijnen (NL); Matthew Gwilym Davidson, Devizes (GB); Strachan McCormick, Bath (GB)

(73) Assignee: TOTALENERGIES CORBION B.V., Gorinchem (NL)

( * ) Notice: Subject to any disclaimer, the term of this patent is extended or adjusted under 35 U.S.C. 154(b) by 704 days.

(21) Appl. No.: 17/776,333

(22) PCT Filed: Nov. 13, 2020

(86) PCT No.: PCT/EP2020/082045
§ 371 (c)(1),
(2) Date: May 12, 2022

(87) PCT Pub. No.: WO2021/094525
PCT Pub. Date: May 20, 2021

(65) Prior Publication Data
US 2022/0403103 A1    Dec. 22, 2022

(30) Foreign Application Priority Data

Nov. 15, 2019    (EP) ..................... 19209447

(51) Int. Cl.
C08G 63/08    (2006.01)
C08G 63/82    (2006.01)

(52) U.S. Cl.
CPC ........... *C08G 63/08* (2013.01); *C08G 63/823* (2013.01)

(58) Field of Classification Search
CPC ..... C08G 63/08; C08G 63/823; C08J 2367/04
See application file for complete search history.

(56) References Cited

U.S. PATENT DOCUMENTS

| 2005/0009687 A1* | 1/2005 | Verkade | C08G 63/823 |
| | | | 502/200 |
| 2016/0075821 A1* | 3/2016 | Gobius Du Sart | C08G 63/08 |
| | | | 528/357 |
| 2019/0169156 A1* | 6/2019 | Yazdanpanah | C07D 319/12 |

FOREIGN PATENT DOCUMENTS

| CN | 102112521 A | 6/2011 |
| CN | 105518052 A | 4/2016 |
| CN | 111690125 A | 9/2020 |
| KR | 20160063885 A | 6/2016 |
| WO | 2009/121830 A1 | 10/2009 |
| WO | 2010/012770 A1 | 2/2010 |
| WO | 2014/177543 A1 | 11/2014 |

OTHER PUBLICATIONS

Chmura et al Highly active and stereoselective zirconium and hafnium alkoxide initiators for solvent-free ring-opening polymerization of rac-lactide (Supplementary Material (ESI) for Chemical Communications The Royal Society of Chemistry 2008, published on Feb. 2008.*
PCT/EP2020/082045 International Search Report and Written Opinion dated Feb. 5, 2021 (10 p.).
Zhiyuan, Zhong, "Fast and Living Ring-Opening Polymerization of L-Lactide Initiated with In-situ-Generated Calcium Alkoxides.", Journal of Polymers and the Environment.,vol. 9, No. 1, Jan. 2001, pp. 31-38 (8 p.).
Chmura et al: "Highly Active stereoselective zirconium and hafnium alkoxide initiators for solvent-free ring-opening polymerization of rac-lactide", Chem. Commun., Feb. 15, 2008, pp. 1293-1295.
Chinese Office Action as Issued on Jan. 29, 2024 in Respect to Counterpart Chinese Patent Application No. 202180029000.2 and Its English Translation.

* cited by examiner

*Primary Examiner* — Gregory Listvoyb
(74) *Attorney, Agent, or Firm* — Amster, Rothstein & Ebenstein LLP (57) ABSTRACT

The present invention relates to a process for polymerizing lactide comprising the steps of a) preparing a liquid catalyst formulation comprising a catalyst, an initiator and lactide, and b) contacting the liquid catalyst formulation prepared in step a) with lactide, and polymerizing said lactide in the presence of said liquid catalyst formulation to form polylactide. The invention further provides a liquid catalyst formulation and use thereof for polymerizing lactide.

13 Claims, 1 Drawing Sheet

PROCESS FOR POLYMERIZING LACTIDE USING A LIQUID CATALYST FORMULATION

CROSS-REFERENCE TO RELATED APPLICATIONS

This application claims the benefit of PCT/EP2020/082045 filed Nov. 13, 2020, which claims priority from EP19209447.2 filed Nov. 15, 2019, which is incorporated herein by reference in its entirety for all purposes.

FIELD OF THE INVENTION

The present invention relates to a process for the preparation of polylactide and in particular to a process for preparing polylactide by lactide melt polymerization in the presence of a liquid catalyst formulation. The present invention also relates to the use of a liquid catalyst formulation for polymerizing lactide.

BACKGROUND OF THE INVENTION

Currently much attention is devoted to polylactide, which is also referred to as polylactic acid and abbreviated as PLA. PLA is an aliphatic polyester, which in essence can be manufactured from renewable resources. Such manufacture may involve the fermentation of starch, sugar or other renewable organic substrates into lactic acid.

PLA can in principle be synthesized by direct polycondensation of lactic acid, i.e. lactate monomers. However, this has the drawback that a high molecular weight is not easily reached.

Therefore, PLA is usually prepared by ring-opening polymerization (ROP) of lactide, the cyclic dimer of lactic acid, which in turn is usually manufactured by polycondensation of lactic acid into PLA oligomers, followed by de-polymerization of these oligomers by a so-called 'back-biting' mechanism in the presence of a suitable catalyst. After purification, the produced lactide can be converted into PLA of controlled molecular weight by means of a ring-opening polymerization reaction (ROP) in the presence of a polymerization catalyst. Ring-opening polymerization allows to control the polymerization process and thereby the structure of the produced PLA. This method can be used to manufacture PLA of high molecular weight.

There is a wealth of potential catalysts for lactide polymerization, many of which rely on an insoluble complex. Typically such catalysts are employed on batch scale, under solvent or solid state conditions.

For instance, the compound tin-octoate or stannous octoate or (also referred in the prior art as to $Sn(Oct)_2$ or stannous bis(2-ethyl-hexanoate)) are well-known as polymerization catalysts in the manufacture of PLA under industrial large volume conditions. WO2009/121830 describes for instance a method for preparing polylactide, in which tin-octoate is used as polymerization catalyst. When the polymerization conditions are property chosen, high quality PLA can be obtained by means of this method. Under such conditions, the use of tin-octoate as catalyst in a lactide-to-PLA process results in a desired fast polymerization rate, affording a polymer resin having a relatively high melt stability and low racemization rate.

Another example is WO2014/177543, which reports the use of a metal coordination compound as active catalyst for ring-opening polymerization of lactide. An example thereof is a zwitterionic zirconium (IV) complex. The polymerisation reaction disclosed in this document consists of mixing lactide with this catalyst to obtain a reaction mixture and the polymerisation of lactide then proceeds at a temperature of at least 150° C. to obtain polylactide in the liquid state. Subsequently, the polylactide is allowed to solidify and recovered. The catalyst is added to the mixture in solid state (as a powder), and dissolves in the lactide monomer melt during use.

Although the above-mentioned catalyst systems may function well under optimized polymerization conditions, there appears to be much interest in alternative polymerisation methods and catalyst systems in order to broaden the possibilities in the manufacture of PLA grades having different or improved properties or characteristics. Moreover, there remains a constant need in the art to find improved methods for the polymerisation of lactide and for improved catalysts systems for use therein.

Accordingly, it is an object of the present invention to provide improved methods for the polymerisation of lactide, and for improved catalyst systems for use therein. It is in particular an object of the invention to provide polymerisation processes that are more efficient and/or show improved reaction kinetics. It is another object of the invention to provide catalyst systems for use in the polymerisation of lactide that are convenient and efficient to use. It is also an object of the invention to provide polymerization processes that allow to prepare polylactide using solid polymerization catalysts. It is also an object of the invention to provide polymerisation processes that allow preparing polylactide having well-defined properties.

SUMMARY OF THE INVENTION

It has now surprisingly been found that the above needs and objectives can be attained either individually or in any combination by a process for the polymerization of lactide as defined herein, and by the use of a liquid catalyst formulation as defined herein.

In particular, according to a first aspect, the present invention relates to a process for polymerizing lactide comprising the steps of:

a) preparing a liquid catalyst formulation comprising a catalyst, an initiator and lactide, and b) contacting the liquid catalyst formulation prepared in step a) with lactide, and polymerizing said lactide in the presence of said liquid catalyst formulation to form polylactide.

The invention provides a process for polymerizing lactide comprising the steps of:

a) preparing a liquid catalyst formulation comprising a catalyst, an initiator and lactide, and b) contacting the liquid catalyst formulation prepared in step a) with lactide, and polymerizing said lactide in the presence of said liquid catalyst formulation to form polylactide, wherein the catalyst is a metal-coordination compound wherein the metal is at least one of Zr or Hf, and wherein the parent ligand of said compound corresponds to formula (I)

Formula (I)

wherein $R^1$, $R^2$, $R^3$, $R^4$, $R^5$, and $R^6$ are each independently selected from the group consisting of H, halogen, —$NO_2$ and a $C_{1-10}$ hydrocarbyl group that is optionally substituted by one or more substituents each independently selected from the group consisting of halogen, hydroxyl, $C_{1-10}$alkyl, halo$C_{1-10}$alkyl, $C_{1-10}$alkoxy and halo$C_{1-10}$alkoxy In another aspect, the present invention relates to a liquid catalyst formulation comprising a catalyst, an initiator and lactide as defined herein.

In another aspect the invention relates to the use of a liquid catalyst formulation according to the present invention for polymerizing lactide.

The invention further provides polylactide obtained or obtainable by a process according to the invention.

The present inventors have now found that it is possible to formulate otherwise insoluble catalyst complexes by pre-reaction with (small amounts) of lactide and initiator. This allows yielding a stable liquid catalyst formulation which may be easily dosed and added to a melt polymerization process of lactide, providing very fast ROP kinetics. The reaction kinetics obtained with a process according to the invention wherein such liquid formulation is applied, are considerably higher than those reported for prior art reactions. A polymerization process according to the invention therefore advantageously allows to use solid polymerization catalysts in the preparation of polylactide. In certain embodiments of a process according to the invention, the liquid catalyst formulation is prepared in step a) by mixing a catalyst provided in a solid form with an initiator and lactide.

The liquid catalyst formulation as applied in a process according to the invention is a stable liquid. When introduced to molten lactide under industrially-relevant polymerization conditions as is done according to the present process, the catalyst formulation provides extremely fast, and predictable kinetics, with no catalyst induction period, and at remarkably low metal concentrations. Accordingly, the process according to the invention yields polylactic acid of well-defined properties such as well-defined molecular weight and/or low polydispersity.

Another advantage of this approach is that only reactants are used in the present process which are employed in the polymerization process. This means that, surprisingly, the polymerisation process according to the invention may be carried out without adding additional (exogenous) reactants, such as exogenous solvents or further initiators during the polymerisation step.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention.

DETAILED DESCRIPTION OF THE DRAWINGS

DETAILED DESCRIPTION OF THE INVENTION

When describing the invention, the terms used are to be construed in accordance with the following definitions, unless a context dictates otherwise.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used in the specification and the appended claims, the singular forms "a", "an," and "the" include plural referents unless the context clearly dictates otherwise. By way of example, "a step" means one step or more than one step.

Unless defined otherwise, all technical and scientific terms used herein have the same meaning as is commonly understood by one of skill in the art. All publications referenced herein are incorporated by reference thereto.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

The term "about" as used herein when referring to a measurable value such as a parameter, an amount, a temporal duration, and the like, is meant to encompass variations of +/−10% or less, preferably +/−5% or less, more preferably +/−1% or less, of and from the specified value, insofar such variations are appropriate to perform in the disclosed invention. It is to be understood that the value to which the modifier "about" refers is itself also specifically, and preferably, disclosed.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded, and that the substitution results in a chemically stable compound. Where groups can be substituted, such groups may be substituted with one or more, and preferably one, two or three substituents.

The terms described above and others used in the specification are well understood to those skilled in the art.

Preferred statements (features) and embodiments of the processes, formulations and uses of this invention are set herein below. Each statement and embodiment of the invention so defined may be combined with any other statement and/or embodiment unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered statements and embodiments, with any other aspect and/or embodiment.

1. A process for polymerizing lactide comprising the steps of:
    a) preparing a liquid catalyst formulation comprising a catalyst, an initiator and lactide, and
    b) contacting the liquid catalyst formulation prepared in step a) with lactide, and polymerizing said lactide in the presence of said liquid catalyst formulation to form potylactide.

2. A process for polymerizing lactide comprising the steps of:
    a) preparing a liquid catalyst formulation comprising a catalyst, an initiator and lactide, wherein said catalyst is applied in a solid form to make the formulation, and
    b) contacting the liquid catalyst formulation prepared in step a) with lactide, and polymerizing said lactide in the presence of said liquid catalyst formulation to form potylactide.

3. A process for polymerizing lactide comprising the steps of:
    a) preparing a liquid catalyst formulation comprising a catalyst, an initiator and lactide, and
    b) contacting the liquid catalyst formulation prepared in step a) with lactide, and polymerizing said lactide in the presence of said liquid catalyst formulation to form polylactide,
    wherein the catalyst applied in step a) is a metal-coordination compound, and wherein the metal is from group IV, and preferably is at least one of Zr or Hf.

4. A process for polymerizing lactide comprising the steps of:
    a) preparing a liquid catalyst formulation comprising a catalyst, an initiator and lactide, and
    b) contacting the liquid catalyst formulation prepared in step a) with lactide, and polymerizing said lactide in the presence of said liquid catalyst formulation to form polylactide,
    wherein the catalyst is a metal-coordination compound wherein the metal is at least one of Zr or Hf, and
    wherein the parent ligand of said compound corresponds to formula (I)

Formula (I)

wherein $R^1$, $R^2$, $R^3$, $R^4$, $R^5$, and $R^6$ are each independently selected from the group consisting of H, halogen, —$NO_2$ and a $C_{1-10}$ hydrocarbyl group that is optionally substituted by one or more substituents each independently selected from the group consisting of halogen, hydroxyl, $C_{1-10}$alkyl, halo$C_{1-10}$alkyl, $C_{1-10}$alkoxy and halo$C_{1-10}$alkoxy.

5. Process according to any of statements 1 to 4, wherein the molar ratio of lactide to catalyst in said formulation is comprised between 50:1 and 500:1, and preferably comprised between 100:1 and 250:1, and for instance is 100:1; 125:1; 145:1; 150:1; 155:1; 175:1; 190:1; or 200:1.

6. Process according to any of statements 1 to 5, wherein the molar ratio of initiator to catalyst in said formulation is comprised between 50:1 and 500:1, and preferably comprised between 100:1 and 250:1, and for instance is 100:1; 125:1; 145:1; 150:1; 155:1; 175:1; 190:1; or 200:1.

7. Process according to any of statements 1 to 6, wherein the molar ratio of lactide to initiator in said formulation is 1:1.

8. Process according to any of statements 1 to 7, wherein said liquid catalyst formulation is prepared by mixing a catalyst, an initiator and lactide to form a slurry and by heating said slurry to a temperature of between 150 and 200° C., and for instance between 170 and 190° C. to obtain a liquid formulation.

9. Process according to any of statements 1 to 8, wherein said slurry is heated between 10 and 120 minutes and preferably between 30 and 60 minutes, to obtain a liquid formulation.

10. Process according to any of statements 1 to 9, wherein said liquid catalyst formulation is prepared in step a) by mixing a catalyst provided in a solid form with an initiator and lactide.

11. Process according to any of statements 1 to 10, wherein the catalyst is a metal-coordination compound.

12. Process according to any of statements 1 to 11, wherein the catalyst is a metal-coordination compound, and wherein the metal is at least one of Zr or Hf.

13. Process according to any of statements 1 to 12, wherein the catalyst is a metal-coordination compound
wherein the metal is at least one of Zr or Hf, and
wherein the parent ligand of said compound corresponds to formula (I)

Formula (I)

wherein $R^1$, $R^2$, $R^3$, $R^4$, $R^5$, and $R^6$ are each independently selected from the group consisting of H, halogen, —$NO_2$ and a $C_{1-1}$n hydrocarbyl group that is optionally substituted by one or more substituents each independently selected from the group consisting of halogen, hydroxyl, $C_{1-10}$alkyl, halo$C_{1-10}$alkyl, $C_{1-10}$alkoxy and halo$C_{1-10}$alkoxy.

14. Process according to any of statements 3 to 13, wherein said metal is Zr.

15. Process according to any of statements 4 to 14, wherein $R^1$, $R^2$, $R^3$, $R^4$, $R^5$, and $R^6$ are each independently selected from the group consisting of H, halogen, —$NO_2$ and a $C_{1-10}$alkyl optionally substituted by one or more substituents each independently selected from halogen or hydroxyl.

16. Process according to any of statements 4 to 15, wherein $R^1$, $R^2$, $R^3$, $R^4$, $R^5$, and $R^6$ are each independently selected from $C_{1-10}$alkyl, preferably from $C_{1-4}$alkyl.

17. Process according to any of statements 4 to 16, wherein $R^1$, $R^2$, $R^3$, $R^4$, $R^5$, and $R^6$ are the same and are t-butyl or methyl, preferably methyl.

18. Process according to any of statements 1 to 17, wherein said initiator is an alcohol.

19. Process according to any of statements 1 to 18, wherein said initiator is an alcohol, selected from the group comprising benzyl alcohol, 1-hexanol, isopropanol, 2-ethylhexanol and 1-dodecanol, and more preferably is benzyl alcohol.

20. Process according to any of statements 1 to 19, wherein the molar ratio of lactide provided in step b) to catalyst ranges between 100,000:1 and 1,000:1, preferably between 80,000:1 and 2,000:1, or preferably between 60,000:1 and 5,000:1.

21. Process according to any of statements 1 to 20, wherein the molar ratio of lactide provided in step b) to initiator ranges between 1500:1 and 2.5:1, preferably between 800:1 and 50:1, or preferably between 750:1 and 50:1.

22. Process according to any of statements 1 to 21, wherein the catalyst concentration in the process, calculated as metal weight, ranges from 1 ppm to 500 ppm, preferably from 2 ppm to 200 ppm, or preferably from 5 ppm to 50 ppm, or preferably from 8 ppm to 25 ppm.

23. Process according to any of statements 1 to 22, wherein the liquid catalyst formulation is contacted in step b) with molten lactide.

24. Process according to any of statements 1 to 23, wherein said lactide is polymerized in the presence of said liquid catalyst formulation at a temperature of at least 100° C., preferably at least 130° C., and preferably at a temperature comprised between 130 and 240° C., more preferably at a temperature comprised between 140 and 220° C.

25. Process according to any of statements 1 to 24, wherein polymerisation is carried out in step b) in the absence of exogenous solvent.

26. Process according to any of statements 1 to 25, wherein polymerisation is carried out in step b) in the absence of exogenous initiator.

27. Process according to any of statements 1 to 26, wherein additional exogenous initiator is added during polymerisation in step b).

28. Process according to any of statements 1 to 27, wherein the lactide applied to prepare the liquid catalyst formulation in step a) is the same as the lactide applied in step b).

29. Process according to any of statements 1 to 27, wherein the lactide applied to prepare the liquid catalyst formulation in step a) is different from the lactide applied in step b).

30. Liquid catalyst formulation comprising a catalyst, an initiator and lactide, wherein said formulation is as defined in any of statements 1 to 19.

31. Use of a liquid catalyst formulation according to statement 30 for polymerizing lactide.

32. Use according to statement 31, wherein said formulation is applied at a molar ratio of catalyst to lactide comprised between 100,000:1 and 1,000:1, preferably between 80,000:1 and 2,000:1, or preferably between 60,000:1 and 5,000:1.

33. Polylactide obtained or obtainable by a process according to any of statements 1 to 29.

The present invention is based on the surprising finding that a catalyst system formulated as a solution may be efficiently used in the polymerisation of lactide. More in particular, the present invention is based on the use of a liquid catalyst formulation, wherein certain amounts of lactide have been "pre-reacted" or "pre-polymerized" or "pre-contacted" with a catalyst and initiator in well-defined molar ratios. In a liquid catalyst formulation as defined in the present invention a solid catalyst is reactively solubilized by reacting this solid catalyst with initial amounts of lactide and an initiator. The inventors have shown that when this liquid catalyst formulation is brought into contact with molten lactide under industrially-relevant polymerization conditions, such liquid catalyst formulation provides extremely fast, predictable kinetics, with no catalyst induction period, at remarkably low metal concentrations, yielding polylactide of well-defined properties. In accordance with the present invention a polymerization process is provided that advantageously allows to use insoluble polymerization catalysts in the preparation of polylactide. In accordance with the present invention a polymerization process is provided that advantageously allows to use polymerization catalysts that are provided in a solid form.

The present invention concerns a process for preparing polylactide by catalyzed polymerisation of lactide monomers. The terms "polylactide", "PLA" and "polylactic acid" are used herein as synonyms.

The invention provides a process for polymerizing lactide comprising the steps of:
a) preparing a liquid catalyst formulation comprising a catalyst, an initiator and lactide, and
b) contacting the liquid catalyst formulation prepared in step a) with lactide, and polymerizing said lactide in the presence of said liquid catalyst formulation to form polylactide.

In certain embodiments, the invention provides a process for polymerizing lactide comprising the steps of:
a) preparing a liquid catalyst formulation comprising a catalyst, an initiator and lactide, wherein said catalyst is applied in a solid form to make the formulation, and
b) contacting the liquid catalyst formulation prepared in step a) with lactide, and polymerizing said lactide in the presence of said liquid catalyst formulation to form polylactide.

Thus, a process for polymerizing lactide according to the invention comprises two main steps that are carried out in the following order. First, a liquid catalyst formulation that comprises a catalyst, an initiator and lactide as defined herein is separately prepared. Then, secondly, this liquid catalyst formulation is added to lactide (monomers) for polymerisation thereof in the presence of the formulation. In other words step a) is done prior to step b). The liquid catalyst formulation prepared in step a) is stable at ambient temperature (e.g. 25° C.) and may therefore be easily prepared and stored before use in a polymerisation reaction of lactide.

The first step in the process according to the invention is thus the preparation of a liquid catalyst formulation. As used herein the term "formulation" is used as synonym for "composition". The term "liquid catalyst formulation" or "liquid catalyst composition" as used herein refers to a liquid composition, i.e. a solution wherein its components, i.e. a catalyst, an initiator and lactide, are in solubilized form. The liquid catalyst formulation and its components are described in detail below.

In a second step of a process according to the invention, the liquid catalyst formulation is contacted to lactide (lactide monomers) for the polymerisation thereof to form polylactide. The term "contacting" is used herein as synonym for "adding" or "combining" or "feeding" or "mixing" or "supplying" and intends to refer to the addition of a formulation as defined herein to lactide for polymerisation of the latter.

It is noted that lactide can exist in three different geometric structures, which have a diastereomeric relationship. Lactide as used in a process of the invention may be L-lactide (derived from two L-lactic acid molecules), D-lactide (derived from two D-lactic acid molecules), meso-lactide (derived from an L-lactic acid molecule and a D-lactic acid molecule), or a mixture of two or more of the above. A 50/50 mixture of L-lactide and D-lactide with a melting point of about 126° C. is often referred to in the literature as D,L-lactide or racemic lactide (and is also denoted as "rac-Lactide" or "racemic lactide" or "rac-lactide" herein). Mixtures of the aforementioned lactides are also suitable for use in the process.

In some embodiments, the lactide used as starting material is L-lactide with up to 50% by weight of other lactides. For example, the lactide used as starting material may be L-lactide containing between 50 and 10% D-lactide. In other embodiments, the lactide is substantially pure L-lactide, where the wording substantially pure means that it may contain up to 10% by weight of other lactides, for example, up to 5% by weight, or up to 1% by weight. In another embodiment, the lactide is substantially pure D-lactide, where the wording substantially pure means that it may contain up to 10% by weight of other lactides, for example, up to 5% by weight, or up to 1% by weight.

In certain embodiments of the present invention, the lactide applied to prepare the liquid catalyst formulation in step a) of the process is the same as the lactide applied in the polymerisation step b) of a process as provided herein. In certain other embodiments of the present invention, the lactide applied to prepare the liquid catalyst formulation in step a) of the process is the not the same as the lactide applied in the polymerisation step b) of a process as provided herein.

In an embodiment, the liquid catalyst formulation is contacted with lactide that is in a molten state. In another embodiment, the liquid catalyst formulation is contacted to solid lactide in step b).

The lactide is polymerized in the presence of said liquid catalyst formulation at a temperature of at least 100° C., preferably at least 130° C. For instance, the lactide is polymerized the presence of said liquid catalyst formulation at a temperature of between 130 and 240° C., or more preferably at a temperature comprised between 140 and 220° C. Preferably, during this polymerisation step, no solvent is added. In other words, the polymerisation is carried out in step b) in the absence of exogenous solvent.

Additional exogenous initiator may be added during the polymerisation reaction in step b) but does not need to be added in addition to the initiator already provided by means of step a). In other words, the polymerisation can advantageously be carried out in step b) in the absence of exogenous initiator. The role of initiator (nucleophile) in the polymerisation of lactide is already fulfilled by the solvent phase of the liquid catalyst formulation, thus eliminating the need for a separate additional initiator to be dosed to the polymerization process. However, the present process also allows for the addition of additional exogenous initiator during the polymerisation reaction in step b).

In certain embodiments of the invention polymerisation of lactide in the presence of a liquid catalyst formulation as defined herein, may also be carried out in the present of other monomers different from lactide monomers, such as for instance related cyclic esters like glycolide. Another useful reactive monomer that may be added during the polymerisation step is for instance caprolactone. Valuable co-polymers for different applications can in this way be manufactured when using these or related reactants together with lactide.

A liquid catalyst formulation as provided herein comprises, and preferably consists of, a catalyst, an initiator and lactide. In particular, a liquid catalyst formulation is provided wherein these three components are provided in well-defined quantities and molar ratios.

In an embodiment, the molar ratio of lactide to catalyst in said formulation is comprised between 50:1 and 500:1, and preferably comprised between 100:1 and 250:1. All individual values and subranges from 50:1 to 500:1 are included herein and disclosed herein; for example, the molar ratio of lactide to catalyst in said formulation may be from a lower limit of 50:1; 60:1; 70:1; 80:1; 90:1; 100:1; 110:1; 120:1; 130:1; 140:1; 145:1; 150:1; 155:1; 160:1; 165:1 to an upper limit of 170:1; 175:1; 180:1; 185:1; 190:1; 195:1; 200:1; 210:1; 220:1; 230:1; 240:1; 250:1; 275:1; 300:1; 350:1; 400:1; 450:1; 500:1. Examples of suitable molar ratios of lactide to catalyst in said formulation include but are not limited to for instance about 100:1; about 125:1; about 145:1; about 150:1; about 155:1; about 175:1; about 190:1; or about 200:1.

In an embodiment, suitable molar ratios of lactide to catalyst in said formulation include but are not limited to for instance (100:1)+/−10%; preferably (100:1)+/−5%; more preferably (100:1)+/−1%. In an embodiment, suitable molar ratios of lactide to catalyst in said formulation include but are not limited to for instance (125:1)+/−10%; preferably (125:1)+/−5%; more preferably (125:1)+/−1%. In an embodiment, suitable molar ratios of lactide to catalyst in said formulation include but are not limited to for instance (145:1)+/−10%; preferably (145:1)+/−5%; more preferably (145:1)+/−1%. In an embodiment, suitable molar ratios of lactide to catalyst in said formulation include but are not limited to for instance (150:1)+/−10%; preferably (150:1)+/−5%; more preferably (150:1)+/−1%. In an embodiment, suitable molar ratios of lactide to catalyst in said formulation include but are not limited to for instance (155:1)+/−10%; preferably (155:1)+/−5%; more preferably (155:1)+/−1%. In an embodiment, suitable molar ratios of lactide to catalyst in said formulation include but are not limited to for instance (175:1)+/−10%; preferably (175:1)+/−5%; more preferably (175:1)+/−1%. In an embodiment, suitable molar ratios of lactide to catalyst in said formulation include but are not limited to for instance (190:1)+/−10%; preferably (190:1)+/−5%; more preferably (190:1)+/−1%. In an embodiment, suitable molar ratios of lactide to catalyst in said formulation include but are not limited to for instance (200:1)+/−10%; preferably (200:1)+/−5%; more preferably (200:1)+/−1%.

In an embodiment, examples of suitable molar ratios of lactide to catalyst in said formulation include but are not limited to for instance 100:1; 125:1; 145:1; 150:1; 155:1; 175:1; 190:1 or 200:1.

In another embodiment, the molar ratio of initiator to catalyst in said formulation is comprised between 50:1 and 500:1, and preferably comprised between 100:1 and 250:1. All individual values and subranges from 50:1 to 500:1 are included herein and disclosed herein; for example, the molar ratio of initiator to catalyst in said formulation may be from a lower limit of 50:1; 60:1; 70:1; 80:1; 90:1; 100:1; 110:1; 120:1; 130:1; 140:1; 145:1; 150:1; 155:1; 160:1; 165:1 to an upper limit of 170:1; 175:1; 180:1; 185:1; 190:1; 195:1; 200:1; 210:1; 220:1; 230:1; 240:1; 250:1; 275:1; 300:1; 350:1; 400:1; 450:1; 500:1.

Examples of suitable molar ratios of initiator to catalyst in said formulation include but are not limited to for instance about 100:1; about 125:1; about 145:1; about 150:1; about 155:1; about 175:1; about 190:1; or about 200:1.

In an embodiment, suitable molar ratios of initiator to catalyst in said formulation include but are not limited to for instance (100:1)+/−10%; preferably (100:1)+/−5%; more preferably (100:1)+/−1%. In an embodiment, suitable molar ratios of initiator to catalyst in said formulation include but are not limited to for instance (125:1)+/−10%; preferably (125:1)+/−5%; more preferably (125:1)+/−1%. In an embodiment, suitable molar ratios of initiator to catalyst in said formulation include but are not limited to for instance (145:1)+/−10%; preferably (145:1)+/−5%; more preferably (145:1)+/−1%. In an embodiment, suitable molar ratios of initiator to catalyst in said formulation include but are not limited to for instance (150:1)+/−10%; preferably (150:1)+/−5%; more preferably (150:1)+/−1%. In an embodiment, suitable molar ratios of initiator to catalyst in said formulation include but are not limited to for instance (155:1)+/−10%; preferably (155:1)+/−5%; more preferably (155:1)+/−1%. In an embodiment, suitable molar ratios of initiator to catalyst in said formulation include but are not limited to for instance (175:1)+/−10%; preferably (175:1)+/−5%; more preferably (175:1)+/−1%. In an embodiment, suitable molar ratios of initiator to catalyst in said formulation include but are not limited to for instance (190:1)+/−10%; preferably (190:1)+/−5%; more preferably (190:1)+/−1%. In an embodiment, suitable molar ratios of initiator to catalyst in said formulation include but are not limited to for instance (200:1)+/−10%; preferably (200:1)+/−5%; more preferably (200:1)+/−1%.

In an embodiment, examples of suitable molar ratios of initiator to catalyst in said formulation include but are not limited to for instance 100:1; 125:1; 145:1; 150:1; 155:1; 175:1; 190:1 or 200:1.

In another embodiment, the molar ratio of lactide to initiator in said formulation is about 1:1, and for instance (1:1)+/−10% or for instance (1:1)+/−5% or for instance (1:1)+/−1%, or for instance is 1:1. Preferably, the lactide and initiator are applied in said formulation in equimolar amounts.

In an example a liquid catalyst formulation is provided wherein the molar ratio of lactide to catalyst is about 200:1; the molar ratio of initiator to catalyst is about 200:1 and the molar ratio of lactide to initiator is about 1:1. In an example a liquid catalyst formulation is provided wherein the molar ratio of lactide to catalyst is (200:1)+/−10%, preferably (200:1)+/−5%, more preferably (200:1)+/−1%; the molar ratio of initiator to catalyst is (200:1)+/−10% preferably (200:1)+/−5%, more preferably (200:1)+/−1%; and the molar ratio of lactide to initiator is (1:1)+/−10%, preferably (1:1)+/−5%, more preferably (1:1)+/−1%. In an example a liquid catalyst formulation is provided wherein the molar ratio of lactide to catalyst is 200:1; the molar ratio of initiator to catalyst is 200:1 and the molar ratio of lactide to initiator is 1:1.

In another example a liquid catalyst formulation is provided wherein the molar ratio of lactide to catalyst is about 150:1; the molar ratio of initiator to catalyst is about 150:1 and the molar ratio of lactide to initiator is about 1:1. In an example a liquid catalyst formulation is provided wherein the molar ratio of lactide to catalyst is (150:1)+/−10%, preferably (150:1)+/−5%, more preferably (150:1)+/−1%; the molar ratio of initiator to catalyst is (150:1)+/−10% preferably (150:1)+/−5%, more preferably (150:1)+/−1%; and the molar ratio of lactide to initiator is (1:1)+/−10%, preferably (1:1)+/−5%, more preferably (1:1)+/−1%. In another example a liquid catalyst formulation is provided wherein the molar ratio of lactide to catalyst is 150:1; the molar ratio of initiator to catalyst is 150:1 and the molar ratio of lactide to initiator is 1:1.

In another example a liquid catalyst formulation is provided wherein the molar ratio of lactide to catalyst is about 100:1; the molar ratio of initiator to catalyst is about 100:1 and the molar ratio of lactide to initiator is about 1:1. In an example a liquid catalyst formulation is provided wherein the molar ratio of lactide to catalyst is (100:1)+/−10%, preferably (100:1)+/−5%, more preferably (100:1)+/−1%; the molar ratio of initiator to catalyst is (100:1)+/−10% preferably (100:1)+/−5%, more preferably (100:1)+/−1%; and the molar ratio of lactide to initiator is (1:1)+/−10%, preferably (1:1)+/−5%, more preferably (1:1)+/−1%. In another example a liquid catalyst formulation is provided wherein the molar ratio of lactide to catalyst is 100:1; the molar ratio of initiator to catalyst is 100:1 and the molar ratio of lactide to initiator is 1:1.

The liquid catalyst formulation of the invention may advantageously be prepared by mixing a catalyst, an initiator and lactide, as defined herein, to form a slurry. This slurry is then heated to obtain the formulation. The slurry is heated between 10 and 120 minutes and for instance between 30 and 60 minutes and for instance for at least 20, at least 35, at least 40, at least 45 or at least 50 minutes, to obtain a liquid formulation. The slurry may be heated to a temperature of between 150 and 200° C., and for instance of between 170 and 190° C., and for instance at 175° C. or 180° C. to obtain a liquid formulation.

The catalyst contained in the liquid catalyst formulation is a catalyst which is suitable for the polymerisation of lactide. The term "catalyst" or "catalyst compound" are used interchangeably herein.

In one embodiment such catalyst is a metal-coordination compound or metal-coordination complex or a metal-ligand coordination compound. The terms "metal-coordination complex" or "metal-coordination compound" or "metal-ligand coordination compound" are used interchangeably herein and all refer to a compound that consists of a central metal ion and one or more surrounding and bound ligands.

In certain embodiments a process for polymerizing lactide is provided comprising the steps of
a) preparing a liquid catalyst formulation comprising a catalyst, an initiator and lactide, and
b) contacting the liquid catalyst formulation prepared in step a) with lactide, and polymerizing said lactide in the presence of said liquid catalyst formulation to form polylactide,
wherein the catalyst applied in step a) is a metal-coordination compound, and wherein the metal is from group IV, and preferably is at least one of Zr or Hf.

In a preferred embodiment, the catalyst applied herein is a metal-coordination compound
wherein the metal is at least one of Zr or Hf, and
wherein the parent ligand of said compound corresponds to formula (I)

Formula (I)

and wherein $R^1$, $R^2$, $R^3$, $R^4$, $R^5$, and $R^6$ are each independently selected from the group consisting of H, halogen, —$NO_2$ and a $C_{1-10}$ hydrocarbyl group that is optionally substituted by one or more substituents each independently selected from the group consisting of halogen, hydroxyl, $C_{1-10}$alkyl, halo$C_{1-10}$alkyl, $C_{1-10}$alkoxy and halo$C_{1-10}$alkoxy.

In certain embodiments a process for polymerizing lactide is provided comprising the steps of:
a) preparing a liquid catalyst formulation comprising a catalyst, an initiator and lactide, and
b) contacting the liquid catalyst formulation prepared in step a) with lactide, and polymerizing said lactide in the presence of said liquid catalyst formulation to form polylactide,
wherein the catalyst is a metal-coordination compound wherein the metal is at least one of Zr or Hf, and
wherein the parent ligand of said compound corresponds to formula (I)

Formula (I)

wherein $R^1$, $R^2$, $R^3$, $R^4$, $R^5$, and $R^6$ are each independently selected from the group consisting of H, halogen, —$NO_2$ and a $C_{1-10}$ hydrocarbyl group that is optionally substituted by one or more substituents each independently selected from the group consisting of halogen, hydroxyl, $C_{1-10}$alkyl, halo$C_{1-10}$alkyl, $C_{1-10}$alkoxy and halo$C_{1-10}$alkoxy.

Each of Zr and Hf are bonded in the metal-coordination compounds as metal ions. It is noted that in the metal-ligand coordination compound, the ligand is anionic, i.e. negatively charged and lacking the protons on the hydroxyl groups. For that reason, the ligand in the formula is indicated as being the "parent" ligand.

The term "hydrocarbyl", or "$C_{1-10}$ hydrocarbyl" or "$C_{1-10}$ hydrocarbyl group" as used herein refers to $C_1$-$C_{10}$ normal, secondary, tertiary, unsaturated or saturated, non-aromatic, acyclic or cyclic, hydrocarbons and combinations thereof. This term therefore comprises alkyl, alkenyl, and alkynyl, and may include for instance $C_{1-10}$alkyl and $C_{2-10}$alkenyl.

The term "$C_{1-10}$alkyl" as a group or part of a group, refers to a hydrocarbyl radical of Formula $C_nH_{2n+1}$ wherein n is a number ranging from 1 to 10. Alkyl groups may be linear, or branched and may be substituted as indicated herein. Preferably, the alkyl group comprises from 1 to 6 carbon atoms, preferably from 1 to 5 carbon atoms, preferably from 1 to 4 carbon atoms, preferably from 1 to 3 carbon atoms. When a subscript is used herein following a carbon atom, the subscript refers to the number of carbon atoms that the named group may contain. For example, the term "$C_{1-6}$alkyl", as a group or part of a group, refers to a hydrocarbyl group of Formula $C_nH_{2n+1}$ wherein n is a number ranging from 1 to 6. For example, $C_{1-6}$alkyl includes all linear or branched alkyl groups having 1 to 6 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, and the like. For example, $C_{1-4}$alkyl includes all linear or branched alkyl groups having 1 to 4 carbon atoms, and thus includes for example methyl, ethyl, n-propyl, i-propyl, 2-methyl-ethyl, butyl and its isomers (e.g. n-butyl, i-butyl and t-butyl), and the like. A preferred alkyl is methyl or butyl and its isomers n-butyl, i-butyl and t-butyl.

The term "alkenyl" or "$C_{2-10}$alkenyl" as used herein is $C_2$-$C_{10}$ normal, secondary or tertiary, linear or cyclic, branched or straight hydrocarbon with at least one site (usually 1 to 3, preferably 1) of unsaturation, namely a carbon-carbon, sp2 double bond. Examples include, but are not limited to: ethylene or vinyl (—CH=CH$_2$), allyl (—CH$_2$CH=CH$_2$), cyclopentenyl (—C$_5$H$_7$), and cyclohexenyl (—C$_6$H$_9$). The double bond may be in the cis or trans configuration. In a particular embodiment, the term alkenyl refers to $C_{2-4}$ hydrocarbons, yet more in particular to $C_{2-4}$ hydrocarbons as further defined herein above. A preferred alkenyl is $C_{2-4}$alkenyl.

As used herein and unless otherwise stated, the term "alkoxy" as a group or part of a group refers to substituents wherein an alkyl group, is attached to an oxygen atom through a single bond, such as but not limited to methoxy, ethoxy, propoxy, butoxy, and the like. A preferred alkoxy is $C_{1-4}$alkoxy.

The term "halogen", or "halo", as a group or part of a group, is generic for fluoro, chloro, bromo or iodo.

The term "hydroxyl" or "hydroxy" as used herein refers to the group —OH.

As used herein the term "aryl", as a group or part of a group, refers to an aromatic hydrocarbon radical of 6-30 carbon atoms derived by the removal of hydrogen from a carbon atom of a parent aromatic ring system. Typical aryl groups include, but are not limited to 1 ring, or 2 or 3 rings fused together, radicals derived from benzene, naphthalene, anthracene, biphenyl, and the like. The term "parent aromatic ring system" means a monocyclic aromatic ring system or a bi- or tricyclic ring system of which at least one ring is aromatic. Therefore, in this embodiment, typical aryl groups include, but are not limited to 1 ring, or 2 or 3 rings fused together, radicals derived from benzene, naphthalene, anthracene, biphenyl, 2,3-dihydro-1H-indenyl, 5,6,7,8-tetrahydronaphthalenyl, 1,2,6,7,8,8a-hexahydroacenaphthylenyl, 1,2-dihydroacenaphthylenyl, and the like. Particular aryl groups are phenyl and naphthyl, especially phenyl.

The term "arylalkyl" or "arylalkyl" as used herein refers to an acyclic alkyl radical in which one of the hydrogen atoms bonded to a carbon atom, typically a terminal or sp3 carbon atom, is replaced with an aryl radical. Typical arylalkyl groups include, but are not limited to, benzyl, 2-phenylethan-1-yl, 2-phenylethen-1-yl, naphthylmethyl, 2-naphthylethyl, and the like. The arylalkyl group comprises 6 to 20 carbon atoms, e.g. the alkyl moiety of the arylalkyl group is 1 to 6 carbon atoms and the aryl moiety is 5 to 14 carbon atoms.

In a preferred embodiment, a catalyst is provided wherein the metal is Zr. In another preferred embodiment, a catalyst is provided wherein the metal is Hf.

In an embodiment, a catalyst is provided wherein $R^1$, $R^2$, $R^3$, $R^4$, $R^5$, and $R^6$ are each independently selected from the group consisting of H, halogen, —NO$_2$ and a $C_{1-10}$alkyl optionally substituted by one or more substituents each independently selected from halogen or hydroxyl.

In an embodiment, a catalyst is provided wherein $R^1$, $R^2$, $R^3$, $R^4$, $R^5$, and $R^6$ are each independently selected from $C_{1-10}$alkyl, preferably from $C_{1-6}$alkyl, more preferably from $C_{1-4}$alkyl.

In an embodiment, a catalyst is provided wherein $R^1$, $R^2$, $R^3$, $R^4$, $R^5$, and $R^6$ are the same and selected from the group consisting of H, halogen, —NO$_2$ and a $C_{1-10}$alkyl optionally substituted by one or more substituents each independently selected from halogen or hydroxyl.

In an embodiment, a catalyst is provided wherein $R^1$ and $R^2$ are identical. In an embodiment, a catalyst is provided wherein $R^3$ and $R^4$ are identical. In an embodiment, a catalyst is provided wherein $R^5$ and $R^6$ are identical. In an embodiment, a catalyst is provided wherein $R^1$, $R^2$, $R^3$, $R^4$, $R^5$, and $R^6$ are identical.

In an embodiment, a catalyst is provided wherein $R^1$, $R^2$, $R^3$, $R^4$, $R^5$, and $R^6$ are the same and selected from $C_{1-10}$alkyl, preferably from $C_{1-6}$alkyl, more preferably from $C_{1-4}$alkyl.

In an embodiment, a catalyst is provided wherein $R^1$, $R^2$, $R^3$, $R^4$, $R^5$, and $R^6$ are the same and are t-butyl or methyl, preferably methyl.

Specific examples of suitable ligands include for instance tris-(-3.5-ditert-butyl-2-hydroxybenzyl)amine and tris-(-3.5-dimethyl-2-hydroxybenzyl)amine.

A specific example of a suitable catalyst according to the invention is for instance represented by Formula (II)

Formula (II)

In this specific embodiment, one metal center is coordinated with two ligands. This results in the formation of so-called zwitterionic structures. Zwitterionic structures, in which one metal center is complexed with two ligands, contain no polymerization-initiating groups by itself. Rather, the complex is expected to form a more active species at higher temperatures, which forms the actual catalytic center. Metal-ligand coordination compounds having this type of ligands are especially interesting in the context of the present invention in view of their simple, straightforward production and compound stability under storage conditions.

The present liquid catalyst formulation comprises an initiator. The term "initiator" or "co-initiator" are used interchangeably herein. In the context of the present invention this compound increases the polymerisation rate of the reaction and provides control over the molecular weight of the obtained polymerization products. In accordance with the present process, the initiator is added in the liquid catalyst formulation. Also, optionally, further exogenous initiator may be added to the reaction mixture during polymerisation step b).

A suitable initiator for use in a liquid catalyst formulation according to the invention may include an alcohol.

In a preferred embodiment, the initiator is an alcohol of formula $R^7$—OH, wherein $R^7$ is selected from the group consisting of $C_{1-20}$alkyl, $C_{6-30}$aryl, and $C_{6-30}$aryl$C_{1-20}$alkyl optionally substituted by one or more substituents selected from the group consisting of halogen, hydroxyl, and $C_{1-6}$alkyl. Preferably, $R^7$ is selected from $C_{3-12}$alkyl, $C_{6-10}$aryl, and $C_{6-10}$aryl$C_{1-12}$alkyl, optionally substituted by one or more substituents, each independently selected from the group consisting of halogen, hydroxyl, and $C_{1-6}$alkyl; preferably, $R^7$ is selected from $C_{3-12}$alkyl, $C_{6-10}$aryl, and $C_{6-10}$aryl$C_{1-12}$ alkyl, optionally substituted by one or more substituents, each independently selected from the group consisting of halogen, hydroxyl and $C_{1-4}$alkyl. The co-initiator can be a mono-alcohol. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol. In an embodiment, non-limiting examples of co-initiators include benzyl alcohol, 1-octanol, 1-decanol, isopropanol, propanediol, trimethylolpropane, 2-butanol, 3-buten-2-ol, 1,3-butanediol, 1,4-butanediol, 1,6-hexanediol, 1,7-heptanediol, 4-bromophenol, 1,4-benzenedimethanol, and (4-trifluoromethyl)benzyl alcohol; preferably, said compound is selected from the group comprising benzyl alcohol, 1-hexanol, isopropanol, 2-ethylhexanol and 1-dodecanol. A particularly suitable example of a co-initiator is benzyl alcohol.

It is understood that similar co-initiators with another nucleophilic group like an amine group may also be used. Macromolecules may also be used as co-initiators as long as they contain suitable end groups like hydroxyl- or amine end groups.

The inventors surprisingly found that only minute amounts of catalyst were needed to transform very large amounts of lactide when using the catalyst compound in a liquid formulation as provided herein. In an embodiment, a process according to the invention is thus provided wherein the molar ratio of lactide (as provided in step b) to catalyst (compound present in the formulation) can be of from about 1,000:1 to about 100,000:1. For example, the molar ratio of said lactide to said catalyst can be from about 2,000:1 to about 80,000:1. For example, the molar ratio of said catalyst to said lactide can be of from about 3,000:1 to about 75,000:1; or from about 5,000:1 to about 60,000:1. For example, the molar ratio of said lactide to said catalyst can be from 1,000:1 to 100,000:1; or from 2,000:1 to 80,000:1. For example, the molar ratio of said catalyst to said lactide can be of from 3,000:1 to 75,000:1; or from 5,000:1 to 60,000:1.

The invention provides a process wherein the molar ratio of lactide provided in step b) to initiator ranges between 1.500:1 and 2.5:1, preferably between 800:1 and 50:1 or preferably between 750:1 and 50:1.

A process according to the invention is further characterized in that the amount of metal, originating from the catalyst compound applied in the process, is minimized. In embodiments of the invention, a process for polymerizing lactide is thus provided wherein the catalyst concentration in the process, calculated as metal weight, ranges from 1 ppm to 500 ppm, preferably from 2 to 200 ppm, more preferably from 5 to 50 ppm, and most preferably from 10 to 25 ppm. The amount of metal may be assessed via conventional analysis techniques known in the state of the art, such as but not limited to e.g. ICP-AES (inductively coupled plasma atomic emission spectroscopy).

The present process allows preparing polylactide of well-defined properties.

In an embodiment, the present process allows the preparation of polylactide, with a number average molecular weight $M_n$ which can range between about 4000 and about 200000 g/mol. For example the $M_n$ of the polylactide obtained can range between about 5000 and about 100000 g/mol. For example the $M_n$ of the polylactide obtained can range between about 6500 and about 75000 g/mol. For example the $M_n$ of the polylactide obtained can range between 4000 and 200000 g/mol, and for instance between 5000 and 100000 g/mol or between 6500 and 75000 g/mol.

In an embodiment, the present process allows the preparation of polylactide having a dispersity (D-stroke or D) of between about 1.0 and about 2.0, and for instance between 1.0 and 2.0 or for instance between 1.0 and 1.5 or for instance between 1.0 and 1.4.

The process of the present invention allows efficient conversion of lactide to polylactide. In an embodiment, the conversion rate can be of from about 70% to about 100%; and for instance, the conversion rate can be of from about 75% to about 99%, or from about 85% to 99%. For instance, the conversion rate can be of from 70% to 100%, or from 75% to 99%, or from 85% to 99%.

The invention will now be illustrated by the following, non-limiting illustrations of particular embodiments of the invention.

EXAMPLES

Materials

The following chemicals where used:

Lactide:

L-lactide (Puralact L, ≥99% (w/w)) and D-lactide (Puralact D, ≥99% (w/w)) were obtained from Total Corbion PLA and used without further purification.

rac-Lactide (50/50 mixture of L-lactide and D-lactide) (Sigma Aldrich, 99%) as used herein was recrystallized three times from dry toluene and dried in vacuo.

Co-Initiator

Benzyl alcohol (Sigma Aldrich, anhydrous, >99.8%) was degassed under dynamic vacuum before use and stored under a dry nitrogen atmosphere.

Catalysts:

Tin-octoate, (Sigma, 92.5-100.0%) was obtained and used as such. Toluene (Fisher, 99.8+%) was purified before use using an MBraun solvent purification system.

A Zwitterionic zirconium compound (herein referred to as "Complex 1"), was prepared as explained in example 1.

Analyses

Absolute Molecular Weight:

Polymer molecular weight data was acquired using an Agilent 1260 Gel permeation Chromatography (GPC) system equipped with triple detection (differential refractive index detector, viscometer and dual angle light scattering detector (90°/15°, 90° data was used). A PLgel 5 μm MIXED-D 300×7.5 mm column was used, with a PLgel 5 μm MIXED Guard 50×7.5 mm guard column. The mobile phase was THF, at a flow rate of 1 ml min$^{-1}$. Columns and detectors were maintained at 35° C. Data was processed using Agilent's GPC/SEC Software, Revision A.02.01. Unless otherwise stated, polymer samples were not purified prior to GPC analysis.

$M_{n,sec}$ as used herein is the measured Mn.

$M_{n,theo}$ as used herein is the predicted Mn, calculated, in the case of polymerization with a catalyst formulation according to the invention, from the conversion rate (% conv) and initiator concentration following the following equation:

$$M_{n,theo} = \left\{ \left( M_{r,LA} \times \frac{\%_{conv}}{100} \times \frac{[LA]}{[ROH]} \right) + M_{r,ROH} \right\}$$

wherein $M_r$ stands for relative molecular mass in g/mol (144,126 for lactide, 108.14 for benzyl alcohol)
wherein LA stands for lactide monomers
wherein ROH stands for alcohol species that are introduced into the polymerization mixture though formulation according to the invention (and optionally additional alcohol species added during step b))
wherein $$\frac{[LA]}{[ROH]}$$

is the molar ratio of LA:ROH in the final polymerization mixture, the total lactide amount in moles is thus comprised of the lactide used in the formulation and the additional lactide used in the polymerisation reaction.

Dispersity can be calculated using the equation $D = M_w/M_n$, wherein $M_w$ is the weight-average molar mass and $M_n$ is the number-average molar mass.

Conversion Rate:

The conversion rate is calculated from the $^1$H-NMR spectrum of the crude product in $CDCl_3$ by determining the ratio of the methine protons of PLA (5.08-5.25 ppm) and lactide monomer (5.0-5.07 ppm). NMR spectra were acquired using a 400 MHz ($^1$H), 101 MHz ($^{13}$C) Bruker Avance spectrometer, unless otherwise stated. $^1$H spectra were acquired using 16 scans. $CDCl_3$ was obtained from Sigma Aldrich and used as received for polymer analysis. Processing was carried out using ACD/NMR Processor Academic Edition, Version 12.01.

Reaction Kinetics:

Reaction kinetics was monitored using in-situ ATR-FTIR spectroscopic techniques.

Concurrently with addition of the catalyst, collection of real-time ATR-FT-IR data commenced. Quantification of lactide and poly(lactic acid) concentrations was achieved by integration of the ATR-FT-IR signals corresponding to the C—O—C stretching mode, at wavenumber regions 1203-1265 $cm^{-1}$ and 1160-1200 $cm^{-1}$, respectively. Integration was carried out between points on the curve corresponding to the relevant wavenumbers. Further data processing and construction of semi-logarithmic plots was carried out using Microsoft Excel.

The in-situ ATR-FT-IR reaction monitoring apparatus was calibrated using sample mixtures of PLA and rac-Lactide, of known molar composition, with respect to the number of lactyl groups (PLA:lactide=0:100, 20:80, 40:60, 60:40, 80:20, and 100:0, respectively). Following acquisition at 174° C. of ATR-FT-IR spectra corresponding to each sample, a calibration curve was constructed, describing the relationship between the integrated area of the lactide signal and the concentration of lactide. Accordingly, the linear relationship between the integrated area of the rac-Lactide signal (1203-1265 $cm^{-1}$) and rac-Lactide concentration (mol %), at 174° C. is described by:

[lactide]=2.7367a+10.938 where a=integrated lactide signal area.

Following heating to 174° C. and acquisition of ATR-FT-IR spectra for calibration, the composition of the mixtures was confirmed via 1H NMR spectroscopy to be unchanged.

TOF:

The catalyst's Turnover Frequency or TOF defines the number of moles of substrate that can be reacted per mole of catalyst per unit time. TOF is defined as:

$$\left\{ TOF = \frac{[LA]_0 \times (1 - [LA]_{t=n\,min}) \times \left(\frac{60}{10}\right)}{[Catalyst]} \right\}$$

EXAMPLES

Example 1: Preparation of Catalyst Compound (Complex 1)

A zwitterionic zirconium compound of Formula II, named herein as complex 1, was prepared as follows.

Formula II

The parent ligands (see Formula I wherein all R groups are methyl) of the Zr coordination compound (Formula II) were prepared by adding hexamethylenetetramine (0.94 g, 6.66 mmol) to a mixture of 2,4 di-substituted phenol (80 mmol) and paraformaldehyde (3.00 g, 100 mmol). The solution was then refluxed for 48 hours and the resulting white powder recrystallized from methanol and ether.

A Zr-coordination compound was then manufactured by reacting $Zr(OiPr)_4(HOiPr)$ in equimolar amounts with the ligands at room temperature for two hours and the catalyst compound was obtained after (re)crystallization. A solid zwitterionic zirconium compound, named complex 1, was thereby recovered.

Example 2: Preparation of Liquid Catalyst Formulations

The following example illustrates the preparation of three embodiments of a liquid catalyst formulation according to the invention.

In the different formulations, f1, f2 and f3, rac-Lactide (see "materials" section) and benzyl alcohol were combined in equimolar quantities under an inert atmosphere, together with respectively 0.005, 0.0067, and 0.010 molar equivalents of complex 1 (also named "solid zwitterionic zirconium compound" or "solid Zr compound") as prepared in example 1 to form a slurry.

The formulations were prepared as follows. In a glove box filled with a dry argon atmosphere, a 50 ml Schlenk flast with J Young's PTFE tap, was charged with 0.347 mmol (0.32 g) of the complex 1, 34.7 mmol (5 g) of rac-Lactide and 34.7 mmol (3.6 ml) of benzyl alcohol, BnOH.

The flask was then sealed, removed from the glove box, and heated in an oil bath with vigorous stirring, to 180° C. for 50 minutes, until a clear yellow solution, formulation f1, was obtained. Formulation f1 remained liquid on cooling to ambient temperature. Mass spectrometry revealed that the solvent phase of f1 was comprised of lactyl oligomers of up to 7 lactic acid units.

Formulations f2 and f3 were prepared in a similar way as formulation f1 whereby the quantity of complex 1 used was adjusted accordingly to obtain the molar equivalents listed above.

The solvent phase of the resulting formulations contains benzyl esters of oligolactides, formed via the ring-opening of lactide in the presence of stoichiometric benzyl alcohol, and subsequent transesterifcation events.

Figure 1:
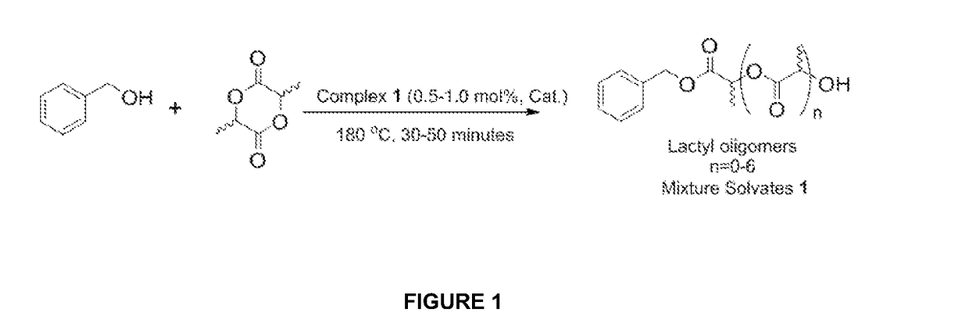
FIG. 1 shows the reaction scheme used to prepare a liquid catalyst formulation according to the invention. The term "complex 1" as used in FIG. 1 refers to the Zr-coordination compound as described in example 1.

Table 1 summarizes the molar compositions of the three liquid catalyst formulations and heating times applied for preparation of each formulation. The reaction scheme used to prepare the illustrated liquid catalyst formulations is represented in FIG. 1.

TABLE 1

| Liquid Catalyst Formulation | Complex 1: relative molar composition | Lactide: relative molar composition | Benzyl alcohol: relative molar composition | Heating time (min) |
|---|---|---|---|---|
| f1 | 1 | 100 | 100 | 50 |
| f2 | 1 | 150 | 150 | 35 |
| f3 | 1 | 200 | 200 | 30 |

Example 3: Polymerisation of Lactide

The following example illustrates the polymerisation of lactide according to a process of the invention in the presence of each of the formulations as disclosed in example 2.

Polymerizations of lactide were performed in a 50 ml jacketed glass batch reactor, heated by means of passing a thermal fluid within the outer jacket. Before feeding lactide to the batch reactor, the reactor was washed with dichloromethane, and dried under a flow of dry air for 1 hour, during which the reactor was heated to 174° C., then cooled to ambient temperature. To the dry reactor, 20 g of rac-Lactide (see "Materials" section) was added. Subsequently the reactor was placed under vacuum (<1 mbar) for 15 minutes. The vacuum was released by adding argon to the reactor. Two further vacuum/argon cycles were carried out on the lactide flakes in the cold reactor, ensuring removal of ambient atmosphere.

The lactide was heated to 174° C. under argon atmosphere, to form a lactide melt. Upon reaching 174° C., a liquid catalyst formulation was added to the reactor and polymerisation of lactide proceeded. The temperature was maintained at 174° C. for a defined period of time and the melt was stirred at 40 rpm. After the desired reaction time had elapsed, the product mixture was poured from the reactor into a beaker, and allowed to cool to ambient temperature. Samples of the obtained PLA were analysed with respect to molecular weight (GPC) and residual lactide monomer content ($^1$H NMR).

Inventive examples IE1, IE2 and IE3 represent polymerisation reactions according to the present invention, respectively using catalyst formulations f1, f2 and f3, as disclosed in example 2.

CE1 represents a comparative example of a lactide polymerisation wherein the same catalyst is applied as in the inventive examples IE1, IE2, and IE3. In CE1 the catalyst and the initiator were individually (separately) dosed to the reactor. Also, the catalyst was applied in solid form (powder) to the reactor. The same reaction conditions (20 g lactide and temperature of 174° C.) were applied as in the inventive examples according to the invention.

Table 2a summarizes the polymerisation conditions, the concentrations of catalyst and initiator and the obtained rate constants for the different reactions. Table 2b summarizes the properties of the resulting polylactide.

TABLE 2a

| example | Duration (min) | [Zr] (mol %) | [Zr] (ppm) | [Benzyl alcohol] (mol %) | Conversion (%) | $k_{obs}$, (min$^{-1}$) | TOF (h$^{-1}$) |
|---|---|---|---|---|---|---|---|
| IE1 | 75 | 0.0130 | 80.8 | 1.3 | 92 | 0.0672 | 25000 |
| IE2 | 90 | 0.0087 | 53.8 | 1.3 | 93 | 0.0889 | 45000 |
| IE3 | 180 | 0.0065 | 40.4 | 1.3 | 94 | 0.0673 | 51000 |
| CE1 | 60 | 0.0130 | 80.8 | 1.3 | 80 | 0.0448 | nd |

TABLE 2b

| example | $M_{n, theo}$ (g/mol) | $M_{n, sec}$ (g/mol) | Đ |
|---|---|---|---|
| IE1 | 10464 | 9250 | 1.078 |
| IE2 | 10576 | 9650 | 1.096 |
| IE3 | 10687 | 10050 | 1.106 |
| CE1 | 9114 | 8950 | 1.08 |

The results of this example show that a liquid catalyst formulation according to the invention can be used in the polymerisation of racemic lactide. The catalyst formulations f1, f2, and f3 contain the Zr coordination compound and alcoholic initiator in various ratios (see Table 1). In each polymerization reaction, the lactide monomerinitiator ratio was 77:1 ([benzyl alcohol]=1.30 mol %). This corresponds to a theoretical molecular weight of 11200 g mol$^{-1}$ at 100% conversion. The fastest polymerization kinetics were achieved with formulation f2 (rac-LA:BnOH:catalyst compound=150:150:1).

Example 4: Polymerisation of Lactide

The following example illustrates the polymerisation of lactide according to a process of the invention in the presence of a catalyst formulation f1 as disclosed in example 2. Polymerisation reactions of racemic lactide (see "Materials" section) were carried out as described in example 3.

Inventive examples IE1, IE4 represent polymerisation reactions according to the present invention, using catalyst formulation f1. CE2 and CE3 represent comparative examples of a lactide polymerisation wherein a liquid tin-octoate polymerisation catalyst is applied. The same reaction conditions were applied as in examples IE1 and IE4. No exogenous solvent or initiator was added during the polymerisation reaction.

Table 3a summarizes the polymerisation conditions, the concentrations of catalyst and initiator and the obtained rate constants for the different reactions. Table 3b summarizes the properties of the resulting polylactide.

Figure 2:
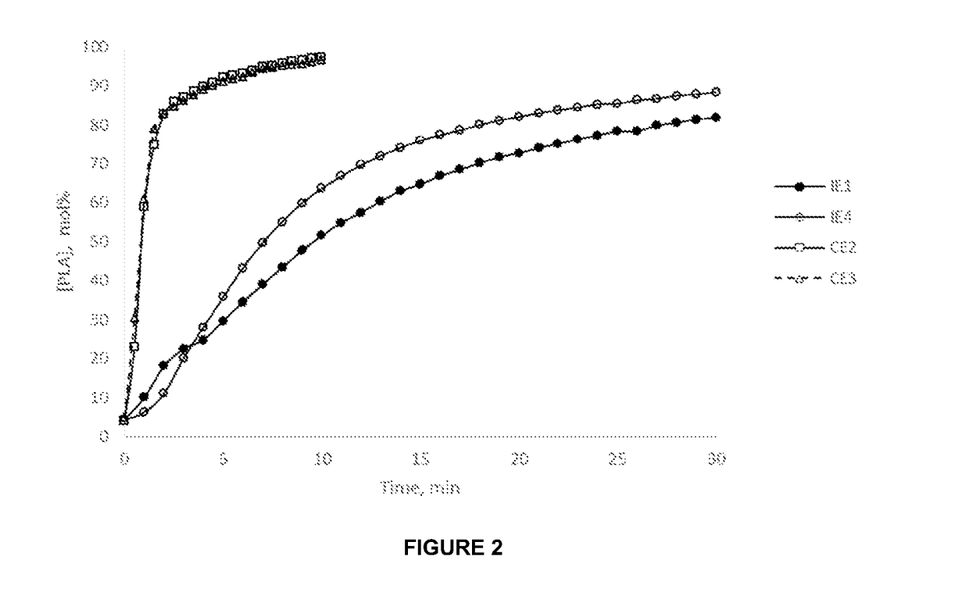
FIG. 2 represents a graph plotting the amount of PLA formed in function of time for polymerisation reactions according to the invention as compared to comparative polymerisation reactions.

The polymerisation reaction kinetics of the different reactions are represented in FIG. 2.

TABLE 3a

| example | [Zr/metal] (mol %) | [Zr/metal] (ppm) | [Benzyl alcohol] (mol %) | Conversion (%) | $k_{obs}$, (min$^{-1}$) |
|---|---|---|---|---|---|
| IE1 | 0.0130 | 80.8 | 1.30 | 92 | 0.0672 |
| IE4 | 0.0195 | 121.2 | 1.95 | 93 | 0.0986 |
| CE2 | 0.0130 | 105.0 | 1.30 | 96 | 1.1042 |
| CE3 | 0.0195 | 157.3 | 1.95 | 95 | 1.2118 |

TABLE 3b

| example | $M_{n, theo}$ (g · mol$^{-1}$) | $M_{n, sec}$ (g mol$^{-1}$) | Đ |
|---|---|---|---|
| IE1 | 10464 | 9250 | 1.08 |
| IE4 | 7131 | 6700 | 1.07 |
| CE2 | 10886 | 18550 | 1.43 |
| CE3 | 7267 | 10600 | 1.35 |

In accordance with the present invention, polylactide with high molar mass and low polydispersity was obtained. The experimentally obtained molar mass ($M_{n,sec}$) were in accordance with the theoretically expected molar mass ($M_{n,theo}$). The process according to the invention achieved high conversion of lactide within a short conversion time at remarkably low metal concentrations.

Example 5: Polymerisation of Lactide

The following example illustrates the polymerisation of lactide according to a process of the invention in the presence of various concentrations of a liquid catalyst formulation according to the invention. Polymerisation reactions of racemic lactide (see "Materials") were carried out as described in example 3. The polymerisation reactions were carried out in the presence of catalyst formulation f1 as described in example 2. As control a reaction was carried out in the presence of 0.25 mol % of benzyl alcohol but in the absence of catalyst compound (see control).

Table 4a summarizes the polymerisation conditions, the concentrations of catalyst and initiator and the obtained rate constants for the different reactions. Table 4b summarizes the properties of the resulting polylactide.

TABLE 4a

| example | Duration (min) | [Zr] (ppm) | [Zr] (mol %) | [Benzyl alcohol] (mol %) | Conversion (%) | $k_{obs}$, (min$^{-1}$) |
|---|---|---|---|---|---|---|
| IE5 | 160 | 61.4 | 0.0099 | 0.99 | 91 | 0.0465 |
| IE6 | 75 | 80.8 | 0.013 | 1.30 | 92 | 0.0672 |
| IE7 | 105 | 109.8 | 0.0177 | 1.76 | 94 | 0.0906 |
| IE8 | 62 | 121.2 | 0.0195 | 1.95 | 93 | 0.0986 |
| IE9 | 60 | 157.5 | 0.0253 | 2.53 | 95 | 0.1229 |
| control | 315 | 0 | 0 | 0.25 | 4 | 0.0002 |

TABLE 4b

| example | $M_{n, theo}$ (g · mol$^{-1}$) | $M_{n, SEC}$ (g mol$^{-1}$) | Đ |
|---|---|---|---|
| IE5 | 13546 | 15100 | 1.08 |
| IE6 | 10464 | 9250 | 1.08 |

TABLE 4b-continued

| example | $M_{n, theo}$ (g · mol$^{-1}$) | $M_{n, SEC}$ (g mol$^{-1}$) | Đ |
|---|---|---|---|
| IE7 | 7917 | 7900 | 1.10 |
| IE8 | 7131 | 6700 | 1.07 |
| IE9 | 5655 | 12650 | 1.09 |
| control | N/A | N/A | N/A |

From this example, it may be concluded that the reaction rate exhibited a first-order dependence on the concentration of the catalyst formulation. Accordingly, the reaction time required for a high-yielding polymerization at a given catalyst loading can be readily calculated. Molecular weight control was generally good, and dispersity recorded for the various PLA polymer products was very narrow (around 1.07 to 1.1) for all PLA polymers.

Example 6: Polymerisation of L-Lactide

The following example illustrates the polymerisation of L-lactide according to a process of the invention in the presence of various liquid catalyst formulations according to the invention. In this example, catalyst formulations prepared in accordance with formulations f1, f2, and f3 (see example 2) have been applied to the ROP of L-lactide (see "Materials" section).

Ring-opening polymerization of lactide was performed in a 2 liter batch reactor. Before feeding lactide to the batch reactor, the reactor was subjected to a vacuum of 3 mbar. Subsequently, the vacuum was released by adding nitrogen to the reactor. This vacuum/nitrogen cycle was performed 3 times to remove any remaining ambient atmosphere. To the dry reactor, a specified amount of L-lactide was added to the reactor (see Table 5a). Subsequently the vacuum/nitrogen cycles were performed on the lactide flakes in the cold reactor. The reactor was then heated to 130° C. After the L-lactide was molten under nitrogen atmosphere, catalyst formulation was added to start the polymerization. The temperature of the melt was increased to 180° C. The temperature was kept at 180° C. for the below indicated period of time (Table 5a), and the melt was stirred at 50 rpm. During the reaction, aliquots (~10 ml) of the reaction mixture were periodically removed from the reactor, and cooled on ice. They were then allowed to warm to ambient temperature. The mixtures were then analysed via $^1$H NMR spectroscopy (via integration of the monomer and polymer methine signals), and molecular weight data was obtained by GPC. These data were used for kinetic analysis. Due to the insolubility of the high-molecular weight P∠LA in THF, crude samples were typically diluted to 0.2 mg ml-1, and molecular weight data was determined using a refractive index detector, calibrated against polystyrene standards, and with application of a Mark-Houwink factor of 0.58.

The reaction process applied in IE10 was unchanged from that described above, except that 2 hours after injection of the catalyst formulation, a further addition of the formulation was made (the temperature was maintained at 180° C. throughout), and the reaction was allowed to proceed for a further 1.5 hours. The GPC data from this reaction was bimodal, corresponding to two initiation events—for each addition of the formulation—showing that transesterification is negligible.

For comparison, the polymerisation reactions according to the invention were compared with a polymerization reaction in which poly-L-lactide was formed in the presence of a liquid tin-octoate (Sn(Oct)$_2$) catalyst. The procedure applied for the comparative reaction (CE5) was similar as that described for examples IE10-IE14, with the difference that tin-octoate (Sn(Oct)$_2$) catalyst was injected into the reactor at the same time as the alcoholic co-initiator.

Table 5a summarizes the polymerisation conditions for the different reactions. Table 5b summarizes the properties of the resulting poly-L-lactide.

TABLE 5a

| Catalyst Formulation or catalyst in accordance with | Duration (min) | [lactide monomer in reactor] (g) | [Metal] (ppm) | [Metal] (mol %) | Initiator (mol %) | Conversion (%) | $k_{obs}$, (min$^{-1}$) |
|---|---|---|---|---|---|---|---|
| IE10 | f1 | 210 | 2000 | 18 + 9 | 0.0029 + 0.0015 | 0.29 + 0.15 | 71 | 0.0042 |
| IE11 | f3 | 120 | 500 | 50 | 0.0081 | 1.62 | 94 | 0.0316 |
| IE12 | f3 | 1350 | 500 | 9 | 0.0015 | 0.29 | 91 | 0.0034 |
| IE13 | f2 | 240 | 500 | 12 | 0.0019 | 0.29 | 78 | 0.0078 |
| IE14 | f2 | 390 | 600 | 8 | 0.0013 | 0.19 | 70 | 0.0035 |
| CE5 | Sn(Oct)$_2$ | 120 | 500 | 44 | 0.0053 | 0.29 | 93 | 0.0401 |

TABLE 5b

| Catalyst Formulation or catalyst in accordance with | $M_{n, theo}$ (g · mol$^{-1}$) | $M_{n, sec}$ (g mol$^{-1}$) | Đ |
|---|---|---|---|
| IE10 | f1 | N/A | 26900(*) | 1.17(*) |
| IE11 | f3 | 8578 | 8750 | 1.18 |
| IE12 | f3 | 45438 | 37700 | 1.30 |
| IE13 | f2 | 38983 | 32200 | 1.27 |
| IE14 | f2 | 53305 | 41350 | 1.36 |
| CE5 | Sn(Oct)$_2$ | N/A | 41800 | 1.94 |

(*)bimodal molecular weight distribution: only highest molecular weight peak was used to determine these values $M_{n,sec}$ polymer molecular weight data was acquired using an Agilent 1260 Gel Permeation Chromatography (GPC) system with refractive index detector, calibrated against 12 polystyrene standards and is reported with application of a Mark-Houwink factor of 0.58. A PLgel 5 µm MIXED-D 300×7.5 mm column was used, with a PLgel 5 µm MIXED Guard 50×7.5 mm guard column. The mobile phase was THF, at a flow rate of 1 ml min$^{-1}$. Columns and detectors were maintained at 35° C. Data was processed using Agilent's GPC/SEC Software, Revision A.02.01.

The obtained results indicate that in examples IE13 and IE14 polylactide of high molecular weight was produced on a short timescale, and in the presence of extremely low metal concentrations (0.0013-0.0019 mol %, 8-12 ppm). Furthermore, where similar metal concentrations were used, comparison of the reaction using a catalyst liquid formulation according to the invention (IE11) and tin octoate, Sn(Oct)$_2$ showed that activity was similar for the two systems.

During reactions IE10 to IE14, aliquots of the reaction mixture were taken for analysis. In all Zr-catalyzed systems, relationship between conversion and molecular weight was consistently linear and no evidence of chain-scission was observed.

The invention claimed is:

1. A process for polymerizing lactide comprising:
   a) preparing a liquid catalyst formulation comprising a catalyst, an initiator and lactide, wherein said liquid catalyst formulation is prepared by mixing a catalyst, an initiator and lactide to form a slurry, and by heating said slurry, and
   b) contacting the liquid catalyst formulation prepared in step a) with lactide, and polymerizing the lactide in the presence of the liquid catalyst formulation to form polylactide, wherein the catalyst is a metal-coordination compound
   wherein the metal is at least one of Zr or Hf, and
   wherein the parent ligand of the compound corresponds to formula (I)

Formula (I)

wherein R$^1$, R$^2$, R$^3$, R$^4$, R$^5$, and R$^6$ are each independently selected from the group consisting of H, halogen, —NO$_2$ and a C$_{1-10}$ hydrocarbyl group that is optionally substituted by one or more substituents each independently selected from the group consisting of halogen, hydroxyl, C$_{1-10}$alkyl, haloC$_{1-10}$alkyl, C$_{1-10}$alkoxy and haloC$_{1-10}$alkoxy.

2. The process of claim 1, wherein the molar ratio of lactide to catalyst in the formulation is comprised between 50:1 and 500:1.

3. The process of claim 1, wherein the molar ratio of initiator to catalyst in the formulation is comprised between 50:1 and 500:1.

4. The process of claim 1, wherein the molar ratio of lactide to initiator in the formulation is 1:1.

5. The process of claim 1, wherein the slurry is heated to a temperature between 15° and 200° C. to obtain a liquid formulation.

6. The process of claim 1, wherein the slurry is heated between 10 and 120 minutes to obtain a liquid formulation.

7. The process of claim 1, wherein R$^1$, R$^2$, R$^3$, R$^4$, R$^5$, and R$^6$ are each independently selected from the group consisting of H, halogen, —NO$_2$ and a C$_{1-10}$alkyl substituted by one or more substituents each independently selected from halogen or hydroxyl.

8. The process of claim 1, wherein the initiator is an alcohol; selected from the group consisting of benzyl alcohol, 1-hexanol, isopropanol, 2-ethylhexanol and 1-dodecanol.

9. The process of claim 1, wherein the molar ratio of lactide provided in step b) to catalyst ranges between 100,000:1 and 1,000:1.

10. The process of claim 1, wherein the molar ratio of lactide provided in step b) to initiator ranges between 1500:1 and 2.5:1.

11. The process of claim 1, wherein the catalyst concentration in the process, calculated as metal weight, ranges from 1 ppm to 500 ppm.

12. The process of claim 1, wherein polymerisation is carried out in step b) in the absence of exogenous solvent.

13. The process of claim 1, wherein the lactide is polymerized in the presence of the liquid catalyst formulation at a temperature of at least 100° C.

\* \* \* \* \*